E. R. YANCH.
MOVING PICTURE MACHINE.
APPLICATION FILED JUNE 16, 1909.

992,098.

Patented May 9, 1911.

3 SHEETS—SHEET 1.

Witnesses
Fenton S. Belt

Inventor
Edwin R. Yanch
By Victor J. Evans
Attorney

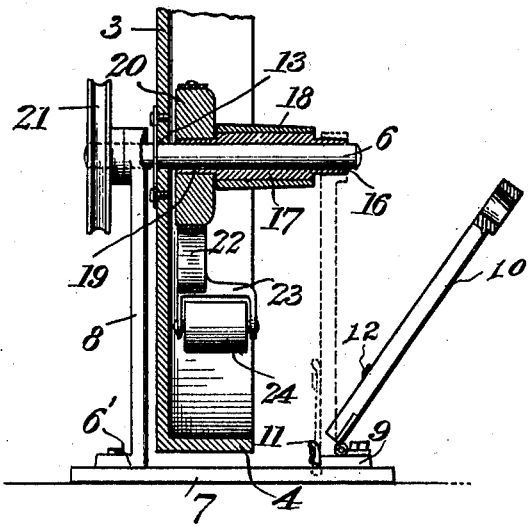
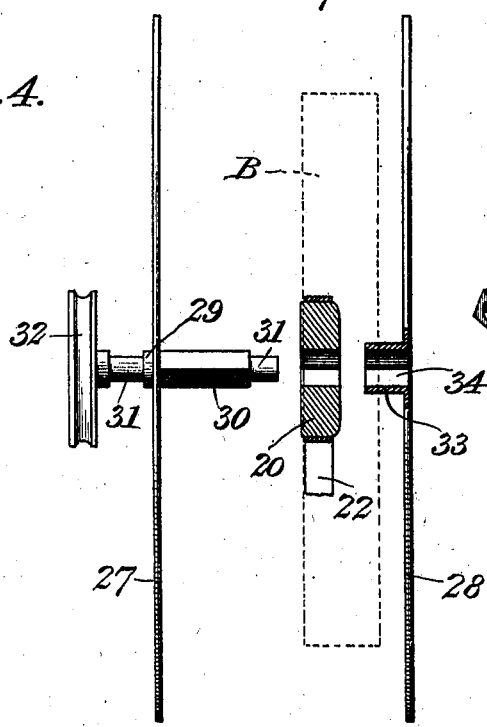
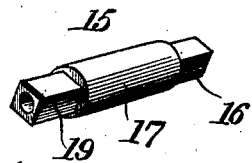

E. R. YANCH.
MOVING PICTURE MACHINE.
APPLICATION FILED JUNE 16, 1909.
992,098.
Patented May 9, 1911.
3 SHEETS—SHEET 3.
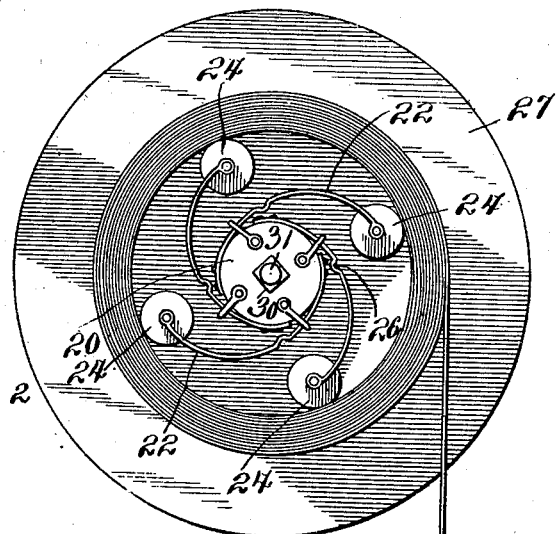
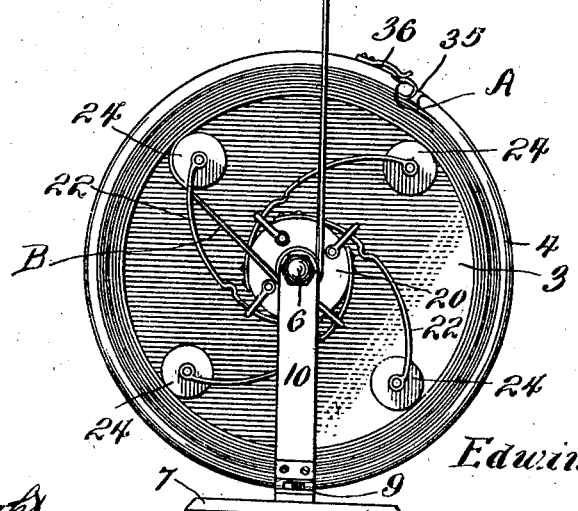
Fig. 6.
Witnesses
J.T.L. Wright
James A. Koehl
Inventor
Edwin R. Yanch,
By Victor J. Evans,
Attorney

UNITED STATES PATENT OFFICE.

EDWIN R. YANCH, OF GALVESTON, TEXAS.

MOVING-PICTURE MACHINE.

992,098.

Specification of Letters Patent.   Patented May 9, 1911.

Application filed June 16, 1909. Serial No. 502,533.

*To all whom it may concern:*

Be it known that I, EDWIN R. YANCH, a citizen of the United States, residing at Galveston, in the county of Galveston and State of Texas, have invented new and useful Improvements in Moving-Picture Machines, of which the following is a specification.

This invention relates to moving picture machines and more particularly to film winding mechanism therefor, and one of the objects of the invention is to provide a mechanism consisting of the combination of magazine and winding reels, the winding reel having means for receiving the film from the magazine reel and winding it in such manner that the front end of the film will be on the outside of the wound portion of the film.

Another object of my invention resides in mechanism of this character having a hollow barrel revolubly mounted and arranged to receive therewithin the film in the initial operation of the machine with which the mechanism is a part, and to provide the said barrel with a slot through which the front end of the film will be disposed, and to further provide a novel form of take-up for said barrel, the said take-up having a series of laying rollers adapted to be yieldingly engaged with the wound portions of the film within the barrel and to hold the windings of the film against casual expansion or separation from each other during the winding operation.

A still further object of my invention is to provide a take-up for the barrel above described which will be removably mounted and adapted to be removed from the barrel with a wound film so that the latter and the said take-up can be effectively placed in their operative positions upon the magazine reel above described, the said take-up in this instance serving as a hub.

Other objects and advantages will be apparent as the nature of the invention is better set forth, and it will be understood that changes within the scope of the claim may be resorted to without departing from the spirit of the invention.

Figure 1:
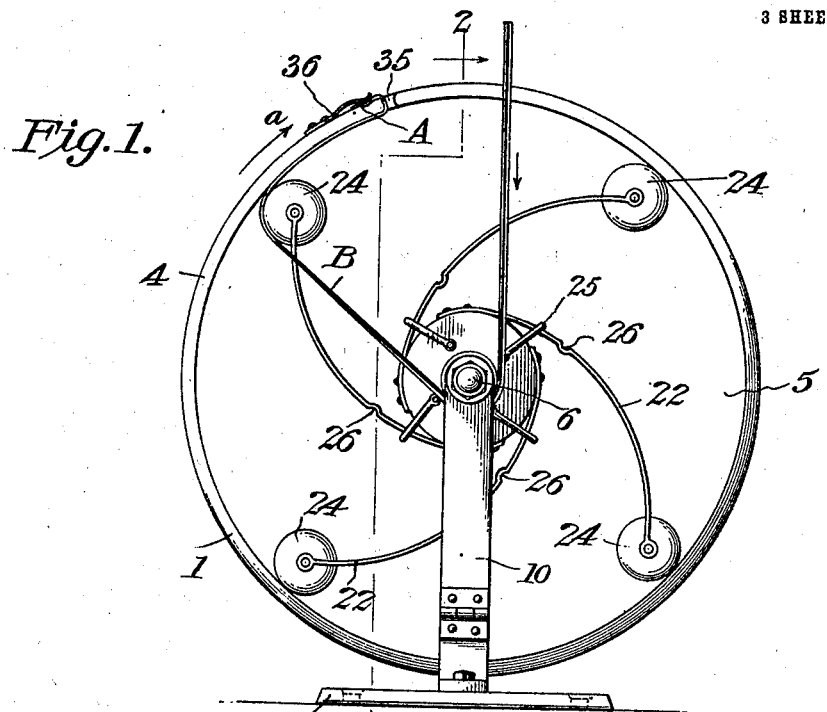
Figure 2:
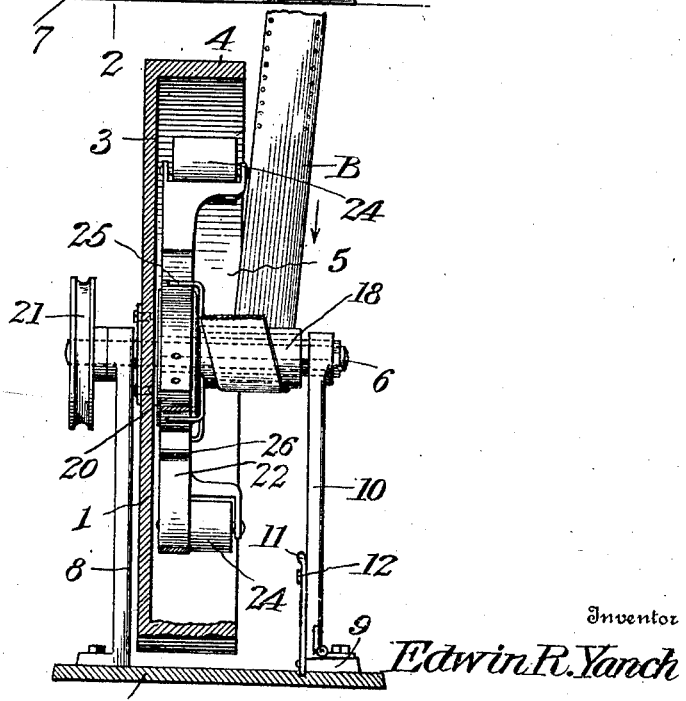

In the drawings, forming a portion of this specification and in which like numerals of reference indicate similar parts in the several views:—Figure 1 is a side elevation of the winding barrel. Fig. 2 is a section taken on the line 2—2 of Fig. 1. Fig. 3 is a detail section through the barrel showing the position of a portion of the supporting bracket when it is desired to remove a wound film from the barrel. Fig. 4 is a fragmentary end view of the magazine reel. Fig. 5 is a detail perspective view of the bushing upon the driven shaft of the barrel. Fig. 6 is a side elevation showing the winding barrel and the magazine reel operatively associated with each other and showing the manner of winding a film from the magazine reel into the winding drum.

The invention consists broadly of what will be termed a winding barrel 1 and a magazine reel 2. The winding barrel consists of a disk or body 3 provided at its peripheral edge with an annular flange 4. The construction of the barrel is such that it is provided with an open side portion or feed opening 5. A bracket 6' is provided and consists of a base 7 provided with a vertically disposed arm 8 and with a member 9 disposed immediately opposite the arm 8, and as shown, the said member has hingedly connected thereto an arm 10 adapted to be moved into a vertical position so as to lie in parallel relation with the arm 8. The member 9 is provided with a suitable latch 11 which is adapted to be engaged with a keeper 12 upon the arm 10 so that the latter can be held perfectly rigid when in its operative position as shown in dotted lines in Fig. 3 of the drawings. The disk or body 3 of the barrel herein shown is provided with a centrally located passage 13. The arm 10 of the bracket 6' is provided at its upper end with a squared aperture 14 which when the arm 10 is in a vertical position lies directly in line with the passage 13 formed in the disk 3.

A bushing 15 is loosely mounted upon a shaft 6, the said bushing having a reduced end portion 16 which corresponds in shape with the aperture 14 formed in the arm 10 and as shown in Fig. 3 this reduced portion is adapted to be fitted in the aperture 14 so that the bushing 15 is held against rotary movement. The bushing is provided with a centrally located enlarged or cylindrical portion 17 upon which is revolubly mounted a cone-shaped sleeve 18. The bushing is provided at its end opposite to the portion 16 with a reduced portion 19 which fits within a correspondingly formed passage at the center of a head 20. The just described construction is such that the head 20 is mounted within the barrel in such manner as will hold it against rotary movement. Any suitable means can be employed for fixing the barrel to the shaft 6 as is obvious. The said shaft is provided at one end with a pulley 21 adapted to be belted to the motor of a moving picture machine.

The head 20 has secured thereto a plurality of radial elastic or spring arms 22 which are forked at their outer ends as shown at 23, and as illustrated particularly in Fig. 3 the arms of each fork have revolubly mounted therebetween a roller 24. In view of the purpose of the arms 22, they collectively will be termed hereinafter a take-up and in view of the elasticity of the arms 22 it will be seen that the rollers 24 are adapted normally for engagement with the inner face of the flange 4. A series of clamps of L-form are mounted upon the head 20 and these clamps are provided with horizontally disposed fingers 25 which are adapted for engagement in depressions 26 formed in the arms 22 whereby the arms can be held in such manner as will cause their rollers 24 to lie out of engagement with the said flange 4 of the barrel.

The magazine reel 2 hereinbefore briefly referred to consists of a pair of disks 27 and 28. The disk 27 carries a centrally located shaft 29 which is provided with a squared portion 30 and with cylindrical end portions 31. The portions 31 are adapted to be mounted in any suitable bearings that will permit the reel to be readily revolved. The shaft 29 has secured thereto at one end a pulley 32 which is adapted to be belted or otherwise geared to the motor of the moving picture machine with which the herein described winding mechanism is used. The disk 28 is provided with a hub 33 in which is formed a squared aperture 34 adapted to be mounted upon the end of the squared portion 30 of the shaft 29.

In operation of the apparatus, assuming the magazine reel to have mounted thereon a wound film, the front end of said film is passed downwardly and beneath the sleeve or guide 18, after which this end of the film is passed beneath one of the rollers 24 and is inserted through a slot 35 formed in the flange 4 of the barrel 1. The terminal end A of the film B herein illustrated is secured to the flange 4 of the barrel by means of a clasp or any other equivalent retaining device 36. Upon reference to Fig. 1 of the drawings, it will be seen that the barrel revolves in the direction of the arrow $a$ so that after the film has been entirely removed from the magazine reel and wound within the barrel 1, the front or terminal end A of the film will be disposed at a point outwardly of the innermost wound portion. The construction of the magazine reel is such that the disks 27 and 28 may be separated from each other as will be fully appreciated.

Having thus described the initial operation of the device wherein I wind from a magazine reel to the herein described barrel, it will be seen that after a film has been entirely wound within the barrel the arm 10 of the bracket 6 can be swung downwardly and the bushing withdrawn from the shaft 6. In view of the fact that the head 20 is mounted upon the reduced end portion 19 of the bushing it is obvious that it will be removed simultaneously with the bushing. This construction permits the wound film to be removed entirely from the barrel by way of the open side portion 5, after which the head 20 can be mounted upon the squared portion 30 of the shaft 29 and the disks 27 and 28 of the reel 2 operatively associated with each other. The reel 2 is then in condition to be mounted again in the uppermost magazine of a moving picture machine. Should it be desired to remove the take-up means entirely from a wound film, it will be seen that the clamps hereinbefore described may be operated so that the fingers 25 thereof can be properly lodged in the depressions 26 formed in the arms 22. In this operation the arms 22 will be moved inwardly so as to draw the rollers 24 entirely out of contact with any portion of the wound film. It will of course be understood that two sets of take-ups will be employed, one for the magazine reel and the other for the winding barrel, each being removably mounted and interchangeable so that the take-up upon the magazine reel can be used in connection with the winding barrel or vice-versa.

I claim:—

In film winding mechanisms, a revoluble reel composed of separable sections, and a barrel adapted for receiving the film from the reel and adapted to wind the same within the barrel so that the front end of the film will be disposed outwardly of the innermost wound portion, and interchangeable film laying means carried by the barrel and reel respectively.

In testimony whereof I affix my signature in presence of two witnesses.

EDWIN R. YANCH.

Witnesses:
S. G. BUCKLEY,
I. M. CHERRY.